United States Patent [19]

Zemke et al.

[11] 4,416,563

[45] Nov. 22, 1983

[54] SHAFT COUPLING DEVICE

[75] Inventors: Edward H. Zemke, Chicago; Kenneth L. Guenther, Park Ridge; Friedrich W. Baethke, Chicago, all of Ill.

[73] Assignee: Bell & Howell Company, Chicago, Ill.

[21] Appl. No.: 362,778

[22] Filed: Mar. 29, 1982

[51] Int. Cl.³ .............................................. F16C 3/00
[52] U.S. Cl. ...................................... 403/14; 403/26; 403/341
[58] Field of Search ................... 403/341, 13, 14, 26; 464/179, 182

[56] References Cited

U.S. PATENT DOCUMENTS

| 686,767 | 11/1901 | Ryder et al. | 403/341 X |
| 2,852,873 | 1/1952 | Larson et al. | 403/341 X |
| 3,606,407 | 9/1971 | Pendergast | 403/341 X |

Primary Examiner—Andrew V. Kundrat
Attorney, Agent, or Firm—Alan B. Samlan; Neal C. Johnson; Alan H. Haggard

[57] ABSTRACT

A device for allowing the removal of a central or coupling shaft which is connected to a main shaft having its ends retained within bearing supports. At the joints between the coupling shaft and main shaft there is complementary coupling pieces which align the coupling shaft with the main shaft. A releasable collar maintains the shafts in a locking relationship and there are locating means on the shaft to positively position the collar around the joint.

20 Claims, 4 Drawing Figures

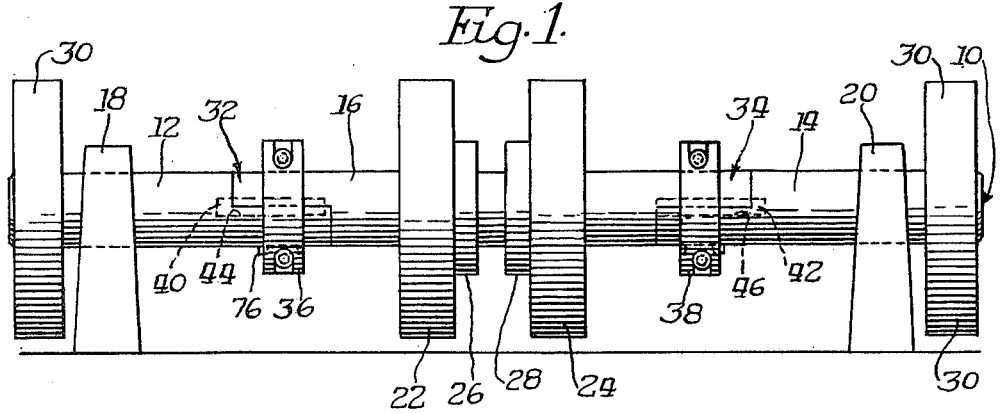
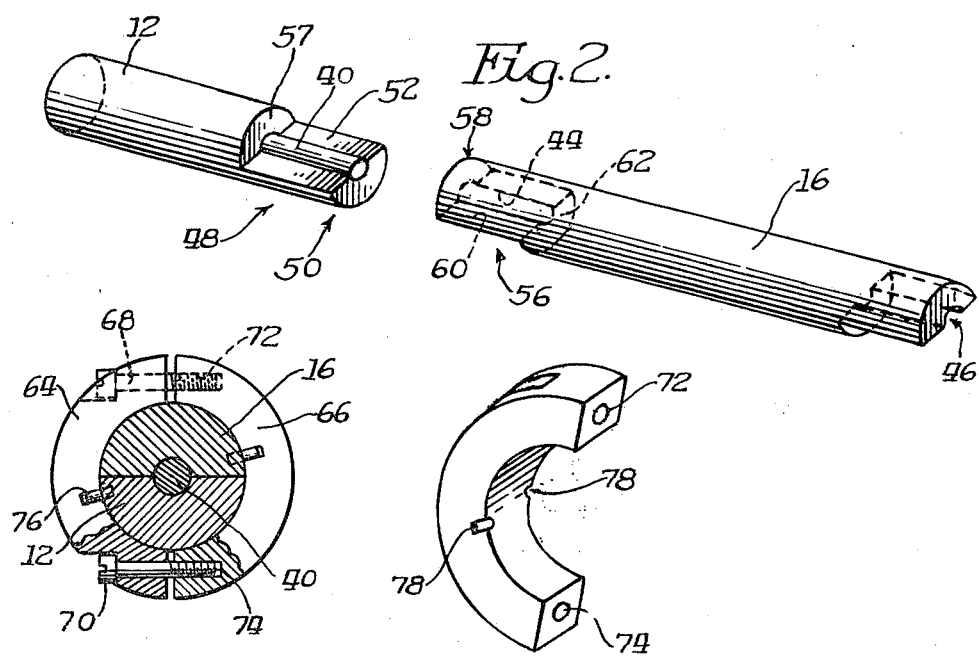

SHAFT COUPLING DEVICE

BACKGROUND AND SUMMARY OF THE INVENTION

This application relates to shaft coupling devices and more particularly to a shaft coupling device which will allow removal of a portion of a shaft between two bearings.

There are many types of machinery used in mail handling and applicable for processing it. Examples of such equipment are illustrated in U.S. Pat. Nos. 2,325,455 entitled "Envelope Handling Machine," and 3,368,321 entitled "Inserter." Such apparatus is particularly useful when a large number of envelopes are processed for mailing, and wherein each envelope is to have one or more inserts added automatically to the envelope before it is sealed. This equipment can be relatively simple, or as the number of inserts is increased, and selection of the inserts is desired, the complexity of the machine increases. Some of these machines have progressed to complete automatic mail handling systems wherein the mail piece is read by optical character recognition equipment; the desired inserts are selected and inserted into the envelope; the envelope is sealed, weighed, and then stacked with visual indication of zip code breaks in the stacked mail. This sophisticated machinery requires numerous mechanical devices to manipulate the envelopes and inserts throughout the system.

Other related equipment is illustrated in U.S. Pat. No. 4,124,435 entitled "Label Cutting Head" wherein address labels are individually cut from a web having many labels, and then applied to the mail piece. It is imperative that the mail piece be positively and accurately moved at precise times in the machine cycle. This is made possible partially through the mechanical movement of several long shafts such as shaft 24, 36 and 38. Some of these shafts are supported by bearings or bearing blocks such as illustrated at the end of shaft 38 by bearings 40. A cuttting blade 46 is operated responsive to the rotation of shaft 38. Outward of bearing 40 is a gear 62 which is connected through a complex drive mechanism to the power input. Thus, the blade 46 is operated in response to the power input through the gear system.

A problem arises in this type of equipment which heretofore has not been solved. Particularly, when the shaft is supported by two bearings, and there is a driving or driven gear outward of the bearings, it is extremely difficult to remove the shaft and replace any worn parts without an extensive amount of disassembly being required. Normally, the complete shaft must be removed from the machine which of itself is a difficult operation unless the bearings are of the type permitting easy removal, such as split bearings. However, if roller bearings are used, this presents the additional problem of slipping the shaft out from the bearings.

A second problem, which is even more difficult to solve than the first, is that removal of the shaft causes the device which is operated off the shaft to be out of time with the rest of the machine. For example, looking at FIG. 2 of U.S. Pat. No. 4,124,435, if shaft 38 is removed from the machine, then the cutting blade 46 which is operated responsive to movement of shaft 38 will be out of time with the rest of the machine unless the machine is retimed such that the cutting blade operates at the proper time in the machine cycle. Thus, retiming is necessary each time the cutting blade 46 has to be removed from the machine due to the wearing out and replacement of bearings 42. A similar problem occurs in this patented device when the feed rollers 22 must be removed due to wear and replaced with new rollers. In fact, this problem occurs often in this type of machinery whenever there are rollers, bearings, or belts which require replacement on a shaft between two bearings supporting the shaft.

A third problem in servicing this machinery is that the components and shafts are closely mounted with little room to manipulate tools or the serviceman's hand. Thus, the more work which must be done to replace components, the more difficult it is to disassemble and re-assemble the machine. For these reasons the maintenance costs involved in this type of equipment is extremely high. A qualified, well-trained serviceman is required to remove the shaft and to retime and reset the entire machine. If the time and training of the serviceman could be reduced, maintenance costs would be proportionately reduced.

One solution to this problem is to attempt to mount high wear items, such as belts and rollers outward of the bearings. Thus, they can be mounted to the shaft and merely slid off the end of the shaft when replacement is necessary. However, this is not always possible or feasible, and the items often have to be mounted between the bearings.

Another solution has been to use split rollers in place of solid rollers when feeding paper and such a substitution is possible. However, this option is not always feasible because of the discontinuity of the roller as compared to a roller made of one piece. If the system can operate with these greater tolerances, the split roller is an alternative. When belts must be replaced, laced or releasable-type belts have been used with some success. Again, this solution is not always available because of the discontinuity of the belt or the greater possibility of tearing or breaking.

Another alternative considered is to make the shaft of several shafts using hub couplings to join the shafts. However, this approach is not practical as the shaft must be machined to receive the hub. This greatly increases the cost of this alternative. Also the hubs take up more room than the diameter of the shaft and there is not sufficient clearance for the hubs in the machinery. A hub is also difficult to reach by the serviceman as the bolts holding the hub together are difficult to get to with tools as they are in alignment with the shaft and not easily accessible. Another shortcoming of using hub couplings is that the alignment of the shafts coupled is not always within the close tolerances required by the mail processing equipment. Thus, there is a need to provide an improved alternative to service mechanical equipment having wear components located on a shaft between the bearing supports. Furthermore, there is a need to provide a less expensive solution to this problem than the previously described methods. Furthermore, it is desired to provide means to replace worn components mounted on a shaft between two bearings without causing the remainder of the machine to be retimed with respect to the components replaced.

Applicants' invention provides another alternative for solving the above-described problem. The inventive solution is to uniquely split and couple the split shaft so that a section of the shaft between the two bearings can be removed. This allows replacement of the components or replacement of the belts on the shaft portion removed. Furthermore, the shaft can be removed and reassembled easily, with accurate alignment of all coupled shafts. The strength and rigidity of the entire shaft assembly is not compromised. Furthermore, this inventive solution does not require any specialized training of the repairman, nor does the repairman have to be able to retime the entire machine. Also, the repairman has open easy access to the coupling, as he works on the coupling from a radial orientation rather than axially.

The solution which Applicants have devised is to split the main shaft into preferably three shafts. The first and second shafts are retained at all times within their respective bearings. Between these two shafts is a coupling shaft which is designed to be removed from engagement with the first and second shafts. At each end of the coupling shaft and at the ends of the first and second shafts, between the bearings, is a coupling piece integral with the shafts. The coupling pieces on the shafts are complementary with one another such that the coupling pieces on the coupling shaft engage the respective coupling pieces of the first and second shafts. A collar is placed around the coupling pieces after engagement to hold the shafts together. There are locating pins along the shafts to accurately position the collar around the coupling pieces which further aids the serviceman in the maintenance procedure. The coupling pieces can take several forms. One which proved to be very satisfactory was to form the ends of the shafts in semicylindrical portions which are complementary with one another. Thus, a collar can be slipped around the coupling pieces and the entire shaft maintains its cylindrical contour over its entire length. A pin or key centrally located with the coupling piece also aids in proper shaft alignment.

OBJECTS AND ADVANTAGES

Thus, it is an object of this invention to provide a means to easily maintain mechanical equipment having wear components, such as belts and rollers, which are mounted on a shaft between two bearings. It is a related object to provide means which can aid in maintaining such machinery at a lesser expense than heretofore possible.

Another object is to provide a means to easily replace wear components mounted on a shaft between two bearings by removing a portion of the shaft between the bearings. Yet another object is to provide for the removal of the shaft with a minimum amount of labor, and to be able to easily reassemble the shaft after the components have been replaced or repaired.

Still another object is to provide a device to replace worn components between bearings on a shaft without disturbing any components mounted on the shaft outboard of the bearings while replacing or repairing those components inward of the bearings.

A related object is to provide a shaft coupling device which does not require large amounts of space clearance and is easily accessible to the serviceman.

These and other objects and advantages will become apparent upon reading the following detailed description of the drawings.

BRIEF DESCRIPTION OF THE DRAWINGS

FIG. 1 is a front elevational view of the inventive shaft coupling device.

FIG. 2 is a perspective exploded view of two shafts to be coupled with the collar and shaft-mounted elements removed for clarity.

FIG. 3 is a cross sectional view with a portion removed taken along line 3—3 of FIG. 1.

FIG. 4 is a perspective view of one-half of the split collar designed to be used to hold the coupled shafts together.

DETAILED DESCRIPTION OF THE DRAWINGS

Turning to FIG. 1 there is illustrated a shaft coupling device of the inventive design. It can be seen that the main shaft 10 is divided into three separate shafts; a first shaft 12; a second shaft 14; and a coupling shaft 16. The main shaft 10 is retained within supporting means or bearings 18, 20. These bearings can be split sleeve, ball bearing, or of other conventional designs. Mounted inward or between the two bearings 18, 20 are components which are prone to wear such as gears or rollers 22, 24 which are illustrated as being mounted on the coupling shaft 16. Normally such mounting is accomplished by means of set screws fastening a hub 26, 28 to the shaft 16. Also, keys are commonly used to maintain the gear 22, 24 from rotating relative to the shaft 16.

Due to the design of the equipment which the inventive device is well suited for, the rollers or gears 22, 24 are prone to wear. For example, they could be sheet feeding rollers which tend to wear out at the periphery of the roller, thus necessitating their replacement. In another application, the elements 22, 24 could be gears with a timing belt driven therefrom. As timing belts eventually wear out or break, replacement is periodically required.

The main shaft 10 is generally driven by means of a pinion 30 which can be placed at either of the ends of the shaft 10. Pinion 30 could be either a driving, driven, or timing gear, and is placed outboard of the bearings 18, 20. If the pinion 30 is connected to a gear train which is part of a complex timed machine, such as an envelope inserter or address labelling machine, it is a tremendous maintenance procedure to remove the shaft 10 as the machine must be retimed after reassembly. Thus, if the rollers or gears 22, 24 could be replaced without disturbing the first shaft 12 or second shaft 14 and their respective pinions 30, it can be observed that a great savings in time and labor would result.

The inventive coupling device has the coupling shaft 16 removable from the first and second shaft 12, 14 at joints 32, 34 which as illustrated, are cylindrical joints. The joints are held together by means of retainers or collars 36, 38. In order to center and maintain proper alignment of the shafts, there is a key 40, 42 placed between the coupling shaft 16 and the first and second shaft 12, 14. The keys 40, 42 are accurately located within each of the shafts by means of a key or pin retaining channel 44, 46, half of which is formed in each of the shafts 12, 14 and 16.

The cylindrical joint 32 is more clearly seen in the exploded drawing of FIG. 2. There is a coupling piece 48 at the end of the shaft 12 which is between the bearings 18 and 20. The coupling piece 48 is at a coupling end 50 of the shaft 12. The coupling end 50 is a substantially flat planer surface perpendicular to the long axis of the shaft 12. There is a face portion 52 on the coupling piece which is in a plane which intersects the long axis of the shaft 12. A shoulder 54 is also in a plane substantially perpendicular to the axis of the shaft and joins the shaft 12 with the face portion 52. The length of the face portion 52 is dependent upon the size of the shafts 12, 16 and the load which the shafts and their related components are subject to.

The coupling shaft 16 has a complementary coupling piece 56 at a coupling end 58 of the shaft 16. There is also a face portion 60 and a shoulder 62. The dimensions of the elements of the coupling piece 56 are such that the faces 52, 60 will be received against each other such that the coupling end 50 will abut the shoulder 62 and the coupling end 58 will abut the shoulder 54. The key 40 is retained within the channel 44 which is centrally disposed within the shafts 12 and 16. Preferably one of the shafts 12 or 16 has the channel extending in a tapered configuration into the shaft past the shoulder 54 or 62. In this manner the pin 40 is securely retained within the shaft and will not be easily removed or dropped and lost upon disassembly of the shafts.

The joint 34 which connects the coupling shaft 16 to the second shaft 14 is of similar configuration as shown in FIG. 2. Other types of coupling pieces could be devised, but the semi-cylindrical coupling elements shown in FIG. 2 are one of the preferred types. This semi-cylindrical coupling piece could be easily machined from standard shaft materials, and maintains shaft strength, rigidity, and alignment which minimizes fatigue due to shaft flexing.

In order to maintain the coupling intact, the collar or retainer 36, 38 is used. This can be a double split collar as illustrated in FIG. 3. Here two halves of the collar 64, 66 are held together around the circumference of the cylindrical joint 32 by means of threaded fasteners 68, 70 which are received within threaded channels 72, 74 respectively. By tightening or loosening the fasteners, the collar can be fastened around or released from the joint.

On shaft 12 at the coupling piece 48 is a small locating pin 76. This is welded or similarly fastened to the circumference of the shaft 12 and serves two purposes. The first is to accurately position the collar 36 with respect to the length or long axis of the shafts along the joint 32. This reduces the possibility of the collar 36 not being positioned at the central or maximum force transmitting portion of the joint 32, or having a portion of the collar 36 extending over one of the shoulders 54 or 62. A second purpose of the locating pin 76 is to engage a positioning slot 78 located on one of the split halves of the collar 36. It can be seen in FIG. 4 that there are two positioning slots 78 which would permit the collar to be put on in either a left hand or right hand orientation, without the repairman worrying about which side of the collar is facing the bearing 18. The location of the positioning slot 78 is such that it provides a radial or rotational reference for the collar along the circumference of the shafts at the joint 34. Thus, the rotation of the collar 36 is prohibited once the pin 76 engages its positioning slot 78. This prohibits the collar from rotating relative to the plane formed by the interface of the face portions 52, 60 as it is desirable to have the split in the collar at approximately 90° relative to the split in the shaft for maximum strength of the joints.

The joint 34 and its associated collar 38, is substantially identical to the assembly of joint 32. Thus, by loosening the fasteners 68, 70 of the collar, the collar can be slid away from its respective joint, allowing the easy removal of the coupling shaft 16 by merely raising it or sliding it out from engagement with the first and second shafts 12 and 14. The belt which is captive on the coupling shaft 16, or the worn rollers or gears 22, 24 can be replaced without disturbing the position, alignment, or engagement of the outboard components or pinion 30 with the rest of the machine. Furthermore, the shaft 10 does not have to be removed from the bearings 18, 20 which presents additional savings in maintenance time. After replacement of the worn parts, the shaft 16 is positioned such that the key 40, 42 properly aligns and seats the coupling shaft with respect to the first and second shafts 12 and 14, and the collar is slid back into its position. Due to the locating pin 76 aiding in positioning of the collars 36, 38, this procedure can be done in cramped or dark quarters as the serviceman does not have to necessarily see the position of the collar relative to the joints, as the locating pin 76 assures its proper positioning both axially and radially.

While the preferred embodiment described an application wherein the coupling shaft is removed from a first and second shaft retained within bearings, the inventive coupling could also be used when coupling just two shafts or when coupling more than three shafts.

Thus, it is apparent that there has been provided, in accordance with the invention, a shaft coupling device that fully satisfies the objects, aims, and advantages set forth above. While the invention has been described in conjunction with specific embodiments thereof, it is evident that many alternatives, modifications, and variations will be apparent to those skilled in the art in light of the foregoing description. Accordingly, it is intended to embrace all such alternatives, modifications, and variations as fall within the spirit and broad scope of the appended claims.

What is claimed is:

1. A device for rigidly coupling at least two shafts comprising:
   a first shaft retained within supporting means;
   a coupling end on the first shaft;
   a coupling piece integral with the first shaft at the coupling end;
   a second shaft to be coupled to the first shaft, the second shaft retained within second supporting means;
   a coupling end on the second shaft extending between the first and second supporting means;
   a coupling piece integral with the second shaft at the coupling end of the second shaft which engages the first coupling piece;
   releasable collar means placed around the coupling ends for rigidly joining the shafts at their coupling ends and
   a locating pin protruding outward from the circumference of the coupling piece on either of the shafts to engage and provide an axial reference position for the collar along the axis of the shafts.

2. The device of claim 1 wherein the coupling piece on each shaft comprises a semi-cylindrical portion along the axis of the shaft, and the coupling pieces are dimensioned so that the semi-cylindrical portions are received in complementary engagement forming a cylindrical joint.

3. The device of claim 2 and further comprising on each shaft a shoulder portion between the shaft and the semi-cylindrical portion and wherein the shoulder portion is at an angle of 90° relative to the axis of the shaft.

4. The device of claim 2 and further comprising on each shaft a shoulder portion between the shaft and the semi-cylindrical portion and wherein the shoulder portion is at an angle less than 90° relative to the axis of the shaft.

5. The device of claim 2 wherein the semi-cylindrical portion on the coupling end of the first shaft has a keyway and the semi-cylindrical portion on the coupling end of the second shaft has a complementary keyway, a key positioned in one of the keyways and dimensioned to be received in complementary engagement in the other keyway when the shafts are coupled.

6. The device of claim 5 wherein the keyways are semi-cylindrical and centrally disposed along the axis of each of the shafts and the key is cylindrical with a diameter substantially identical to the diameter of the keyways.

7. The device of claim 1 wherein the collar has a channel portion on its inside wall which is dimensioned to closely receive the locating pin to provide a radial reference position for the collar along the circumference of the shafts.

8. The device of claim 7 wherein the collar is a split ring collar.

9. The device of claim 1 wherein the supporting means are bearings.

10. A device for rigidly coupling shafts comprising:
a first shaft retained within first supporting means;
a coupling end on the first shaft extending beyond the first supporting means;
a first coupling piece integral with the first shaft at the coupling end of the first shaft;
a second shaft to be coupled to the first shaft and retained within a second supporting means;
a coupling end on the second shaft extending between the first and second supporting means;
a second coupling piece integral with the second shaft at the coupling end of the second shaft;
a coupling shaft positioned between the first shaft and the second shaft, each end of the coupling shaft having integral therewith a coupling piece which engages the first and second coupling pieces of the first and second shafts;
releasable collar means placed around the coupling pieces for rigidly joining and maintaining the shafts in locking relationship;
a locating pin protruding outward from the circumference of the coupling piece on at least one of the shafts to engage and provide an axial reference position for the collar along the axis of the shafts;
whereby the coupling shaft can be separated from the first and second shafts without necessitating any rotation of the first and second shafts and while the first and second shafts are retained within their respective supporting means.

11. The device of claim 10 wherein the coupling pieces on all shafts comprise semi-cylindrical portions along the axis of the shafts and are dimensioned so that the semi-cylindrical portions on the coupling shaft are received in complementary engagement with the semi-cylindrical portions of the first and second shafts thereby forming cylindrical joints at the areas of shaft engagement.

12. The device of claim 11 and further comprising on each shaft a shoulder portion between the shaft and the semi-cylindrical portion and wherein the shoulder portion is at an angle of 90° relative to the axis of the shaft.

13. The device of claim 11 and further comprising on each shaft a shoulder portion between the shaft and the semi-cylindrical portion and wheerein the shoulder portion is at an angle less than 90° relative to the axis of the shaft.

14. The device of claim 11 wherein the semi-cylindrical portions on the coupling ends of the first and second shafts have keyways therein and the semi-cylindrical portions on each end of the coupling shaft has a complementary keyway, a key positioned in one of the keyways at each end of the coupling shaft and dimensioned to be received in complementary engagement in the other keyway when the shafts are coupled.

15. The device of claim 14 wherein the keyways are semi-cylindrical and centrally disposed along the axis of each of the shafts and the key is cylindrical with a diameter substantially identical to the diameter of the keyway.

16. The device of claim 10 wherein the collar has a channel portion on its inside wall which is dimensioned to closely receive the locating pin to provide a radial reference position for the collar along the circumference of the shafts.

17. The device of claim 16 wherein the collar is a split ring collar.

18. The device of claim 10 wherein the supporting means are bearings.

19. Apparatus for rigidly coupling a first shaft retained within first supporting means to a second shaft retained within second supporting means by means of a coupling shaft comprising:
a coupling end on the first shaft extending between the first and second supporting means;
a first coupling piece integral with the first shaft at the coupling end of the first shaft;
a coupling end on the second shaft extending between the first and second supporting means;
a second coupling piece integral with the second shaft at the coupling end of the second shaft;
the coupling shaft positioned between the first shaft and the second shaft, each end of the coupling shaft having integral therewith a coupling piece which engages the first and second coupling pieces of the first and second shafts;
the coupling pieces on all the shafts being semi-cylindrical portions along the axis of the shafts, and dimensioned so that the semi-cylindrical portions on the coupling shaft are received in complementary engagement with the semi-cylindrical portions of the first and second shafts thereby forming cylindrical joints at the areas of shaft engagement;
releasable collar means placed around the cylindrical joints for rigidly joining and maintaining the shafts in locking relationship;
a locating pin protruding outward from the circumference of the coupling piece on at least one of the shafts to engage and provide an axial reference position for the collar along the axis of the shafts;
whereby the coupling shaft can be separated from the first and second shafts while the first and second shafts are retained within their respective supporting means.

20. The device of claim 19 wherein the collar has a channel portion on its inside wall which is dimensioned to closely receive the locating pin to provide a radial reference position for the collar along the circumference of the shafts.

* * * * *